(12) United States Patent
Schreiner et al.

(10) Patent No.: US 10,544,836 B2
(45) Date of Patent: Jan. 28, 2020

(54) CONSTRUCTION MACHINERY HAVING A DECOUPLED HYDRAULIC MOTOR

(71) Applicant: LIEBHERR-WERK TELFS GMBH, Telfs (AT)

(72) Inventors: Markus Schreiner, Thaur (AT); Wolfgang Schatz, Mieming (AT)

(73) Assignee: Liebherr-Werk Telfs GmbH, Telfs (AT)

( * ) Notice: Subject to any disclaimer, the term of this patent is extended or adjusted under 35 U.S.C. 154(b) by 276 days.

(21) Appl. No.: 15/445,721

(22) Filed: Feb. 28, 2017

(65) Prior Publication Data

US 2017/0254364 A1    Sep. 7, 2017

(30) Foreign Application Priority Data

Mar. 1, 2016   (DE) .................. 10 2016 002 436

(51) Int. Cl.
    *F16D 3/12*    (2006.01)
(52) U.S. Cl.
    CPC ...................... *F16D 3/12* (2013.01)
(58) Field of Classification Search
    CPC ................. F16D 3/12; F16D 3/68; F16D 3/06
    USPC ............................... 464/73, 92–96
    See application file for complete search history.

(56) References Cited

U.S. PATENT DOCUMENTS

| 2,025,825 | A |   | 12/1935 | Ricefield |
|-----------|---|---|---------|-----------|
| 2,034,001 | A |   | 3/1936  | Ricefield |
| 2,928,264 | A | * | 3/1960  | Goldsmith ............... F16D 3/78 464/94 |
| 3,606,392 | A | * | 9/1971  | Garrett ................ E21B 17/04 464/96 |
| 2004/0082390 | A1 |   | 4/2004 | Nosaka et al. |
| 2015/0252854 | A1 |   | 9/2015 | Hakamata |
| 2016/0146262 | A1 |   | 5/2016 | Kogure |

FOREIGN PATENT DOCUMENTS

| DE | 907004 B      | 3/1954 |
| DE | 10349279 A1   | 5/2004 |
| DE | 112013007327 T5 | 6/2016 |

* cited by examiner

*Primary Examiner* — Greg Binda
(74) *Attorney, Agent, or Firm* — McCoy Russell LLP (57) ABSTRACT

An apparatus for connecting a hydraulic motor to a transmission, wherein the apparatus comprises two metal disks and an elastomer layer provided therebetween, wherein both metal disks and the elastomer layer comprise at least one passage, and wherein the metal disks have an at least partly mutually meshing profile at the sides facing one another. The present disclosure is also directed to a construction machine having at least one hydraulic motor and having at least one transmission, wherein the hydraulic motor and the transmission are connected to one another by means of a corresponding apparatus.

15 Claims, 10 Drawing Sheets

CONSTRUCTION MACHINERY HAVING A DECOUPLED HYDRAULIC MOTOR

CROSS-REFERENCE TO RELATED APPLICATION

This application claims priority to German Patent Application No. 10 2016 002 436.4, entitled "Construction Machinery Having a Decoupled Hydraulic Motor," filed on Mar. 1, 2016, the entire contents of which are hereby incorporated by reference for all purposes.

TECHNICAL FIELD

The present disclosure relates to an apparatus for connecting a hydraulic motor to a transmission, wherein the apparatus comprises two metal disks and an elastomer layer provided therebetween, wherein both metal disks and the elastomer layer comprise at least one passage, and wherein at least one metal disk and the elastomer layer have an at least partly mutually meshing profile at the sides facing one another.

BACKGROUND AND SUMMARY

Apparatus of the category serves to connect hydraulic motors to corresponding transmissions or other components in a manner damped for structure-borne noise. It is problematic with the apparatus known from the prior art that they cannot optimally support or receive axial and/or radial translocations or forces between the hydraulic motor and the transmission as well as bending loads on the bending of the connection of the hydraulic motor and transmission. The known apparatus are also difficult to assemble or dismantle in the devices in which the hydraulic motor is installed.

It is therefore the object of the present disclosure to provide an improved apparatus for connecting a hydraulic motor, in particular to a transmission. The apparatus accordingly comprises two metal disks and an elastomer layer provided therebetween, wherein both metal disks and the elastomer layer comprise at least one passage that is in particular radially inwardly disposed, and wherein at least one metal disk and the elastomer layer have an at least partly mutually meshing profile at the sides facing one another. The mutually meshing profile in this respect makes it possible to particularly effectively minimize or support the axial and radial translocations or the corresponding forces. It is conceivable in this respect in an embodiment that at least one of the passages has a circular cross-section and/or that the ratio of metal to elastomer is between 90/10 and 80/20. The largest damping effect with simultaneously a support of radial and axial forces that is as large as possible in particular result in accordance with the present disclosure in this ratio range.

It is conceivable in a further embodiment that the passages are arranged coaxially and/or that the passages are provided radially inwardly disposed at the respective parts. A centered connection of the hydraulic motor to the transmission is hereby possible, whereby imbalances or an uneven transmission of forces between the components is prevented or minimized. The correspondingly at least partly rotationally symmetrical parts can also be manufactured particularly simply.

It is conceivable in a further embodiment that the passage of one of the metal disks has a smaller radius than the passage of the other metal disk and/or of the elastomer layer and/or that the passage of one of the metal disks has the same radius as the passage of the elastomer layer. It is possible to arrange the elastomer layer simply centered with respect to the metal disk by the smaller radius of one of the metal disks and a ring or a ring structure optionally provided in the inner region of the metal disk.

It is conceivable in a further embodiment that at least one of the metal disks comprises a ring at a side disposed opposite the other metal disk, wherein the ring in particular has a rectangular cross-sectional surface. The ring is thus present at an outer region of the apparatus with respect to the total structure of the apparatus. The ring can in this respect be arranged concentrically with respect to the metal disk at which it is present. It is thus possible to insert the total apparatus into a corresponding cut-out in a centered manner by means of the ring. The cut-out can in this respect be provided at the hydraulic motor or at the transmission.

Provision can in this respect be made in an embodiment that a radially inwardly disposed surface of the ring bounds the radially inwardly disposed passage of the corresponding metal disk. The inner radius of the ring and of the passage of the metal disk can therefore be the same, which accordingly simplifies the manufacture of the component.

It is conceivable in a further embodiment that at least one of the metal disks and the elastomer layer comprises screw counterbores that also extend at least partly in the respective other metal disk. It is thus possible to push screws through both metal disks and through the elastomer layer disposed therebetween and thus to connect the apparatus to other components.

It is conceivable in a further embodiment that at least one of the metal disks and/or the elastomer layer has/have a circular outer contour and/or that the elastomer layer has a Shore A hardness of 50-70, 55-65, or 60, and/or that the elastomer layer consists of hydrogenated nitrile butadiene rubber (HNBR). The Shore hardness can also have different specific values than 60 within the claimed range in dependence on the specific configuration of the geometry of the metal disks.

It is conceivable in a further embodiment that the elastomer layer is vulcanized at at least one of the metal disks and/or that the metal disks are composed of steel and/or that the elastomer layer and/or the metal disks comprises/comprise a ring structure that is in particular wavelike.

The present disclosure is also directed to a construction machine having at least one hydraulic motor and having at least one transmission, wherein the hydraulic motor and the transmission are connected to one another by means of an apparatus.

Further details and advantages of the present disclosure are shown with reference to the Figures.

BRIEF DESCRIPTION OF THE FIGURES

FIGS. 1-11B are drawn to scale indicating an example embodiment of particular relative dimensions, such as lengths, widths, thickness, curvature, positioning, etc., relative to each other. However, alternative relative dimensions may be used, if desired.

DETAILED DESCRIPTION

Figure 1:
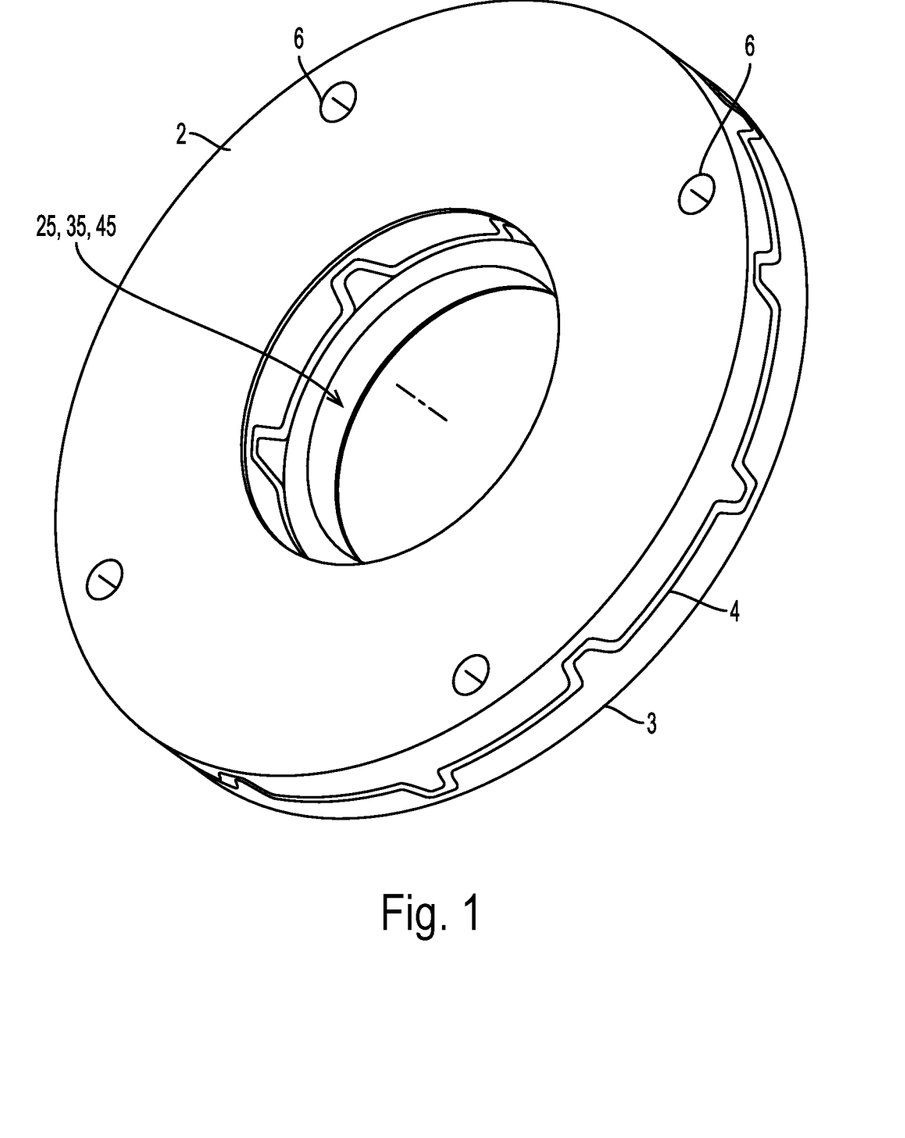
FIG. 1 shows an apparatus in accordance with the present disclosure in a perspective view.

FIG. 1 shows an apparatus 1 in accordance with the present disclosure for connecting a hydraulic motor 10 with a transmission 20. The apparatus 1 comprises two metal disks 2, 3 and an elastomer layer 4 provided therebetween. Both metal disks 2, 3 and the elastomer layer 4 each comprise a respective radially inwardly disposed passage 25, 35, 45. It can be recognized at the lateral and inner regions of the apparatus 1 that the metal disks 2, 3 and the elastomer layer 4 have a mutually meshing profile at the sides facing one another. The apparatus 1 serves the vibration decoupling of the hydraulic motor 10 from the transmission. It is also conceivable that the apparatus 1 is used for coupling the hydraulic motor 10 to a different structure than a transmission 20. In accordance with its purpose, the apparatus 1 can be called a decoupling element or a decoupling component.

The passages 25, 35, 45 of the components of the apparatus 1 have a circular cross-section in the embodiment of FIG. 1. The metal disks 2, 3 surround the elastomer layer 4 by two sides, with it being able to be recognized that the ratio of metal to elastomer in the apparatus being able to be between 90 to 10 and 80 to 20. The passages 25, 35, 45 of the individual components are arranged coaxially in the embodiment of FIG. 1. It can furthermore be recognized that the passage 35 of the metal disk 3 at the right in FIG. 1 has a smaller radius than the passage 25 of the other metal disk 2. It can also be recognized that the passage 25 of the left hand metal disk 2 has the same radius as the passage 45 of the elastomer layer 4.

The outer radius of the metal disks 2, 3 and the elastomer layer 4 is the same in the embodiment of FIG. 1 such that a common cylindrical outer surface of the apparatus 1 results.

Four screw counterbores 6 into which corresponding screws can be introduced are furthermore provided at the apparatus 1 of FIG. 1. The apparatus 1 can be connected to a different object or can be screwed to this object via the screws. The screw counterbores 6 can in this respect extend within both metal disks 2, 3 and within the elastomer layer 4. The counterbore can be cylindrical in one of the metal disks 2, 3 and can have a constant radius while the counterbore in the other one of the metal disks 2, 3 is formed from two cylindrical recesses having two different radii such that an abutment for a screw led through them is present. The screw heads of the screws thus lie on that metal disk 2, 3 that is positioned more closely to the attachment object and whose recesses 6 have an abutment for the screws. The metal disk 2, 3 spaced further apart from the object is exclusively or partly coupled to the metal disk 2, 3 connected via the screws via the elastomer layer 4 such that an indirect coupling of the hydraulic motor 10 to the transmission 20 is present via the elastomer layer 4 and a corresponding damping function or decoupling function of the apparatus 1 is ensured.

The metal disks 2, 3 and the elastomer layer 4 have a circular outer contour in the embodiment of FIG. 1. The connection between the metal disks 2, 3 and the elastomer layer 4 can be achieved by vulcanization of the elastomer layer 4 to the metal disks 2, 3. The metal disks 2, 3 themselves can be composed of steel.

The apparatus in accordance with the present disclosure thus represents a rubber-metal component in which an elastomer layer 4 for damping structure-borne noise is provided between two metal disks 2, 3. The apparatus 1 in accordance with the present disclosure in this respect has a particularly compact construction that is achieved in that the apparatus 1 is functionally a combination of a transmission flange and a decoupling element known per se. The apparatus 1 in accordance with the present disclosure is thus not only designed with regard to the function of the damping of structure-borne noise, but also with regard to a axial translocation from the motor axis to the transmission axis that is as small as possible.

The apparatus 1 in accordance with the present disclosure is furthermore particularly simple to manufacture. Advantages furthermore result in the assembly of the apparatus 1, with the apparatus 1 being able to be assembled by the screw counterbores 6 or cylinder head screw counterbores from the same side as the hydraulic motor 10 coupled by the apparatus 1. The installation of the apparatus 1 is thereby simpler under tight space conditions, as is the dismantling, for example in the case of damage. The apparatus 1 can be pre-assembled at a gearbox, for example, and/or can be directly installed at the traction drive in the support frame of the corresponding machine. The elastomer material of the elastomer layer 4 is designed in this respect such that it is resistant to high temperatures up to in particular 140° and can withstand external influences such as hydraulic oil and other corrosive substances. It can be seen from the cross-section of the apparatus 1 that the ratio of metal to elastomer can also amount to more than 90 to 10, with it being able to adopt up to 92 percent of the total cross-section or of the total volume of the apparatus 1. Due to the disk shape of the apparatus 1, the connection surface of the elastomer layer 4 vulcanized on is substantially larger than with a narrower ring shape, whereby the elastomer layer 4 can also withstand high tensile stresses.

Figure 2A:
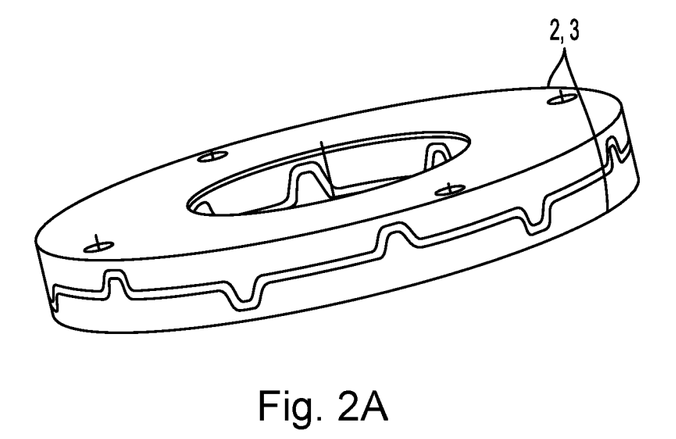
FIG. 2A shows a perspective view of an elastomer layer with a metal disk disposed behind it.
Figure 2B:
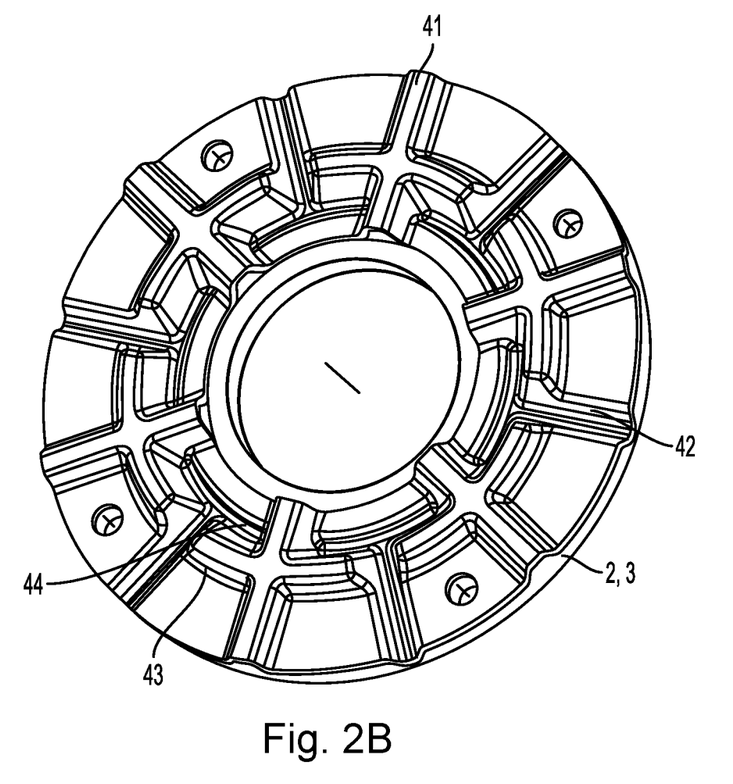
FIG. 2B shows a different perspective view of an elastomer layer with a metal disk disposed behind it.

A plan view of the elastomer layer 4 with the metal disk 2, 3 vulcanized on behind it and a perspective side view of the total apparatus 1 are shown in FIGS. 2A and 2B. In this respect, radially extending supports 41, 42 can be recognized that are parts of the profile of both the elastomer layer 4 and of the metal disks 2, 3. The radially extending supports 41, 42 serve the support of the apparatus 1 in the torsional or peripheral direction. In the embodiment of FIG. 2, six supports 41 are shown that project out of the plane of the drawing and six supports 42 that project into the plane of the drawing. A number of supports 41, 42 differing therefrom can also be provided. The supports 41, 42 are in this respect profile elements of the elastomer layer 4 and of the metal disks 2, 3 that allow a mutual meshing of the metal disks 2, 3 and of the elastomer layer 4. Segmented supports that extend in the peripheral direction are furthermore shown that effect a damping of the apparatus 1 in the radial direction. The peripheral supports 43 are just like the radial supports 41 an 42 profile elements that are provided both in the metal disks 2 3 and in the elastomer layer 4. Like the radial supports 41, 42, the peripheral supports 43 also mesh into one another in the individual components of the apparatus 1. They thus represent positives and negatives of one another in a good approximation in the respective components. The radial supports 41 and peripheral supports 43 projecting out of the plane of the drawing in the embodiment of FIG. 2 can in this respect intersect one another and can thus comprise a common cruciform region, in particular a common cruciform surface.

Peripheral supports 44 are furthermore shown that are aligned opposite the peripheral supports 43 and project into the plane of the drawing. The passage 25, 35 of one of the metal disks 2, 3 has a smaller radius in the embodiment of FIG. 2 than the passage 45 of the elastomer layer 4. The elastomer layer 4 can thus be arranged centered along a corresponding formation at the corresponding metal disk 2, 3.

Figure 3:
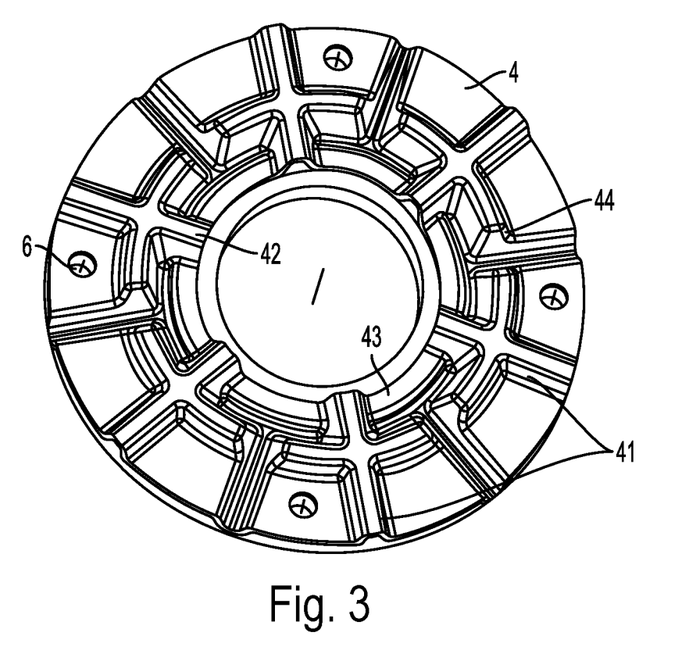
FIG. 3 shows a detailed view of an elastomer layer.

FIG. 3 shows a detailed view of the elastomer layer 4, with supports 41, 42, 43, 44 and the screw counterbores 6 being recognizable. The screw counterbores 6 can in this respect be provided in the region of the elastomer layer 4 and can overall be provided within regions of the apparatus 1 in which no supports 41 to 44 are provided.

Figure 4:
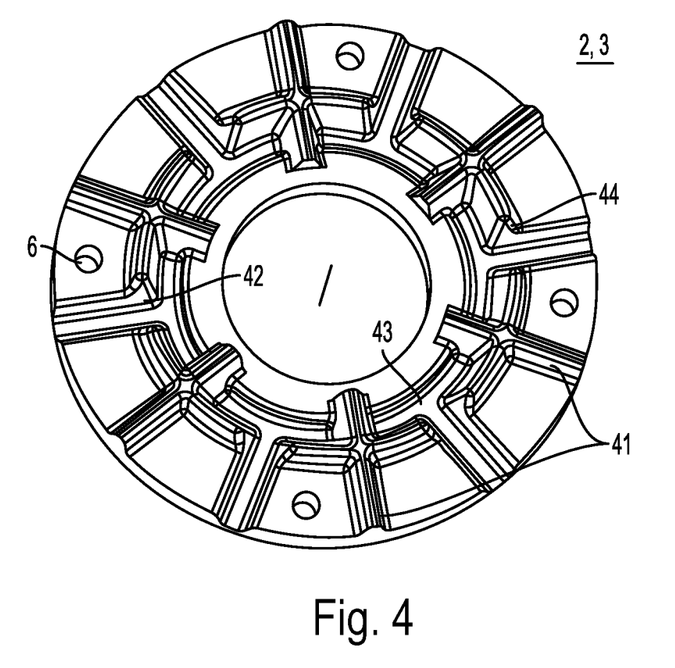
FIG. 4 shows a detailed view of a metal disk.

FIG. 4 shows a detailed view of one of the metal disks 2, 3, with corresponding supports 41 to 44 and passages 6 also being shown in FIG. 3. The surface structure of the metal disk 2, 3 is in this respect congruent with the surface structure of the elastomer layer 4, not shown in FIG. 4, adjacent to it. The surface structure of the metal disk 2, 3 is thus a negative to the positive of the surface structure of the elastomer layer 4 adjacent thereto. The components shown in FIGS. 3 and 4 are rotationally symmetrical about 180°, wherein they can also be rotationally symmetrical in a manner differing therefrom.

Figure 5A:
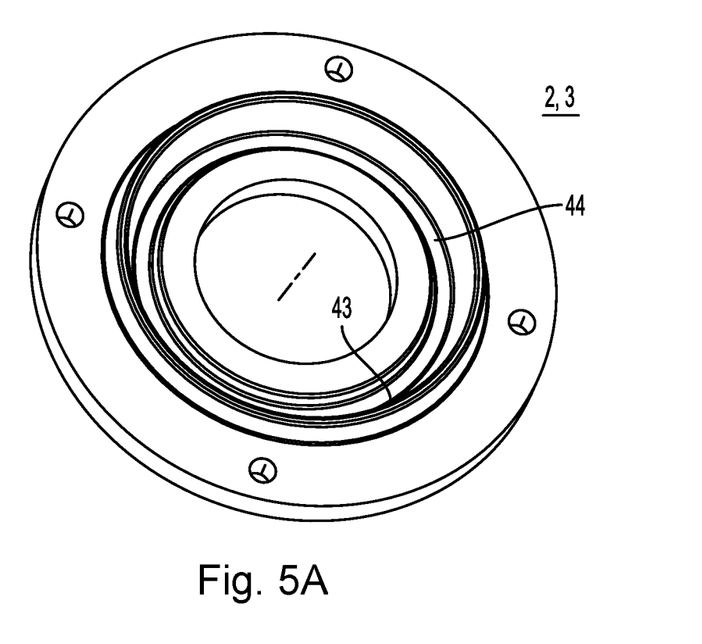
FIG. 5A shows a variant of the metal disk.
Figure 5B:
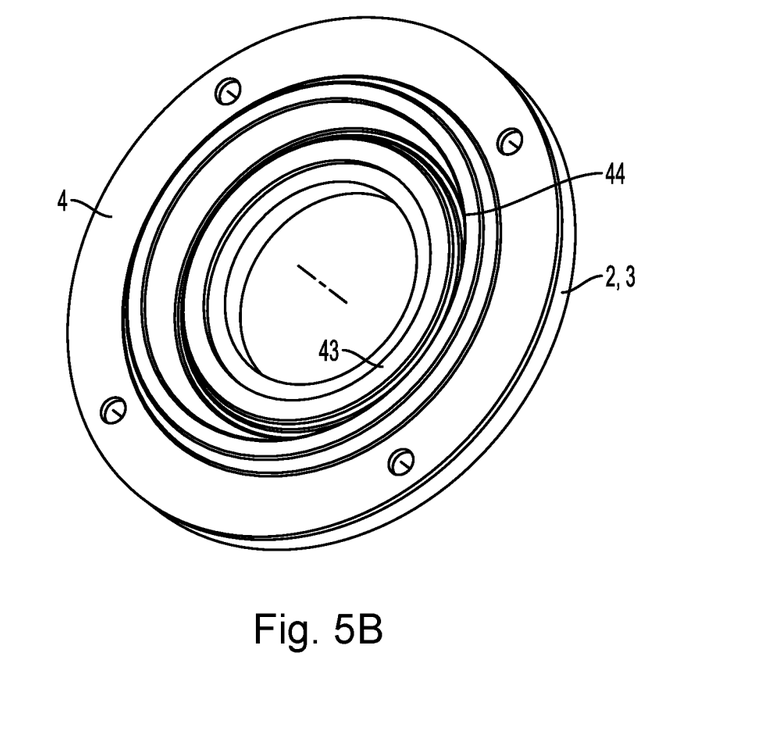
FIG. 5B shows another variant of the metal disk.

FIGS. 5A and 5B show variants of the metal disks 2, 3 in which no radial supports are provided for damping in the torsional direction. Only peripheral supports 43, 44 are provided. Provision can also be made that more than two radial supports 43, 44 are provided. The elastomer layer 4 that is shown in FIG. 5B and that lies on the metal disk 2, 3, lying thereunder has a profile corresponding to the profile of the metal disks 2, 3 in the embodiment of FIGS. 1 to 3.

The specific elastomer geometry that is shown in FIGS. 1, 2, 3, 5A, and 5B serves with the wavelike rings shown therein for supporting radial forces and bending loads between the hydraulic motor 10, the transmission 20 and the apparatus 1 in accordance with the present disclosure.

Figure 6A:
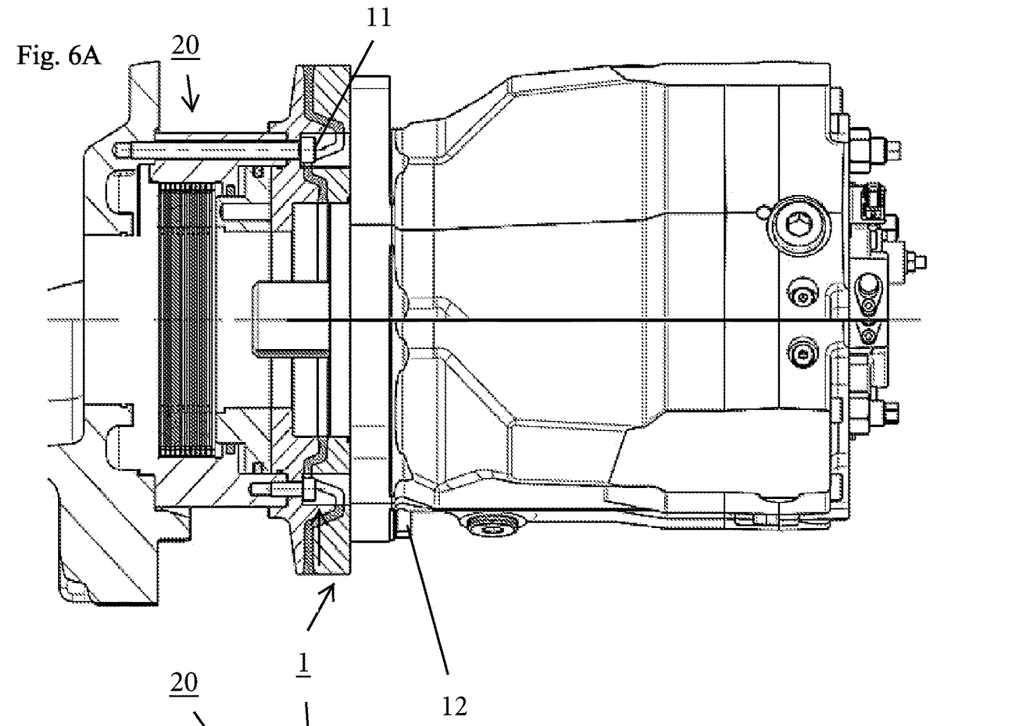
FIG. 6A shows a 2D sectional representation of a transmission add-on assembly with an apparatus in accordance with the present disclosure.
Figure 6B:
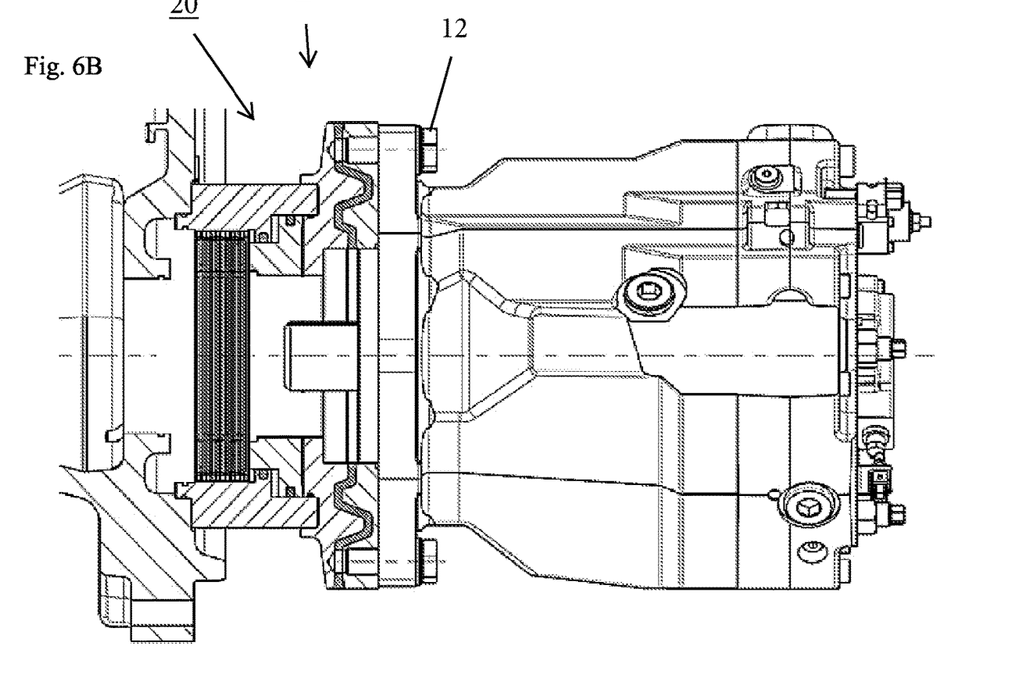
FIG. 6B shows another 2D sectional representation of the transmission add-on assembly of FIG. 6A.
Figure 6C:
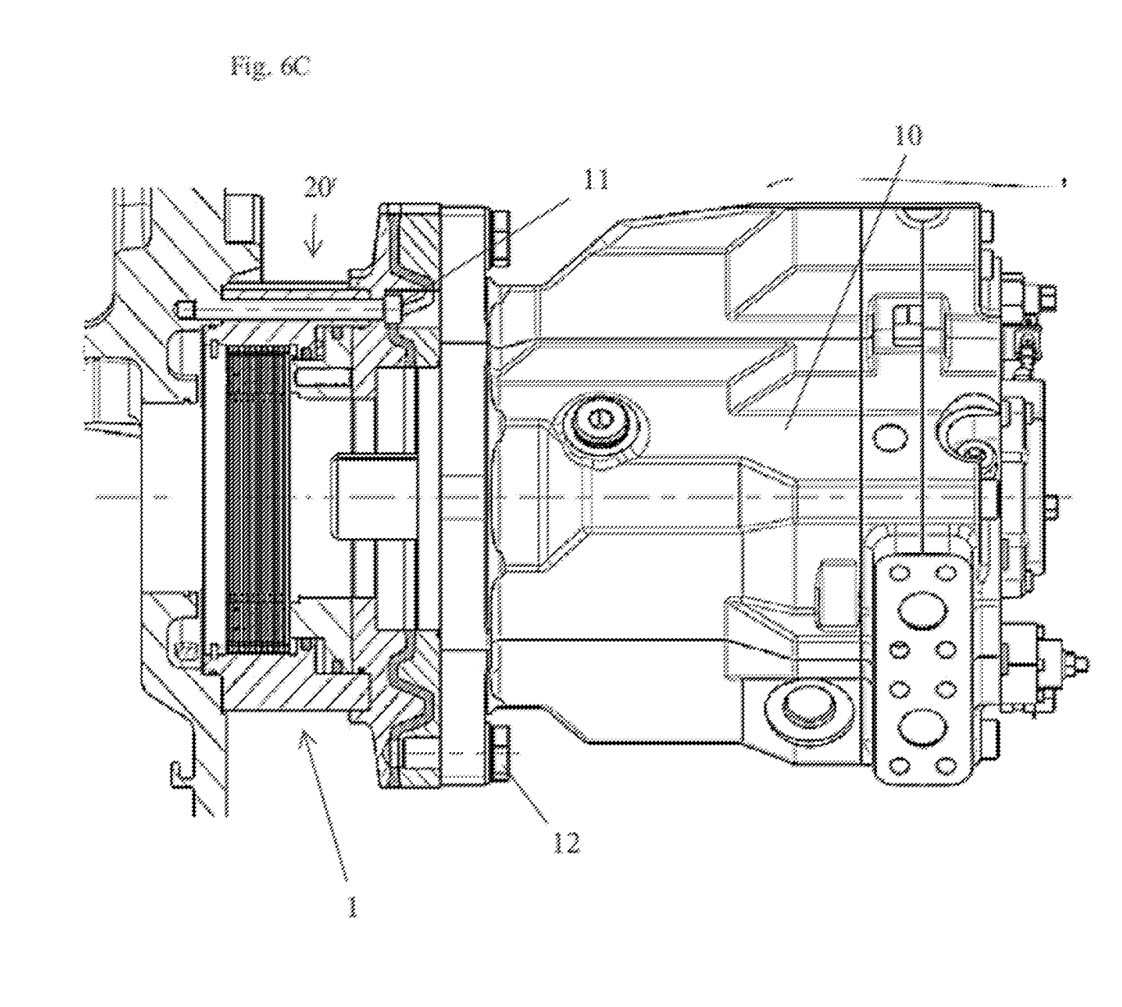
FIG. 6C shows another 2D sectional representation of the transmission add-on assembly of FIG. 6A.

FIGS. 6A to 6C show an hydraulic motor 10 that is coupled to a transmission 20 via an apparatus 1 in accordance with the present disclosure. The apparatus 1 is in this respect coupled to the transmission 20 via screws 11 while the hydraulic motor 10 is screwed to one of the metal disks 2, 3 via screws 12. The left hand metal disk 2 thus serves the coupling of the apparatus 1 to the transmission 20 while the right hand metal disk 3 couples the hydraulic motor 10 to the apparatus 1. The connection of the metal disks 2, 3 can take place exclusively via the elastomer layer 4. A vibration damping can thus take place between the two metal disks 2, 3.

Figure 7A:
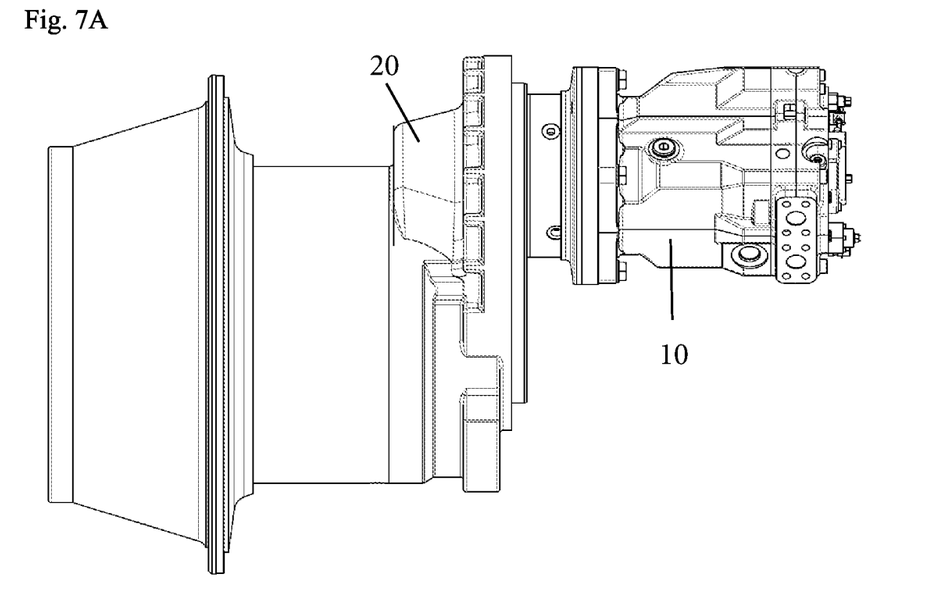
FIG. 7A shows an outer view of a hydraulic motor coupled to a transmission via an apparatus in accordance with the present disclosure.
Figure 7B:
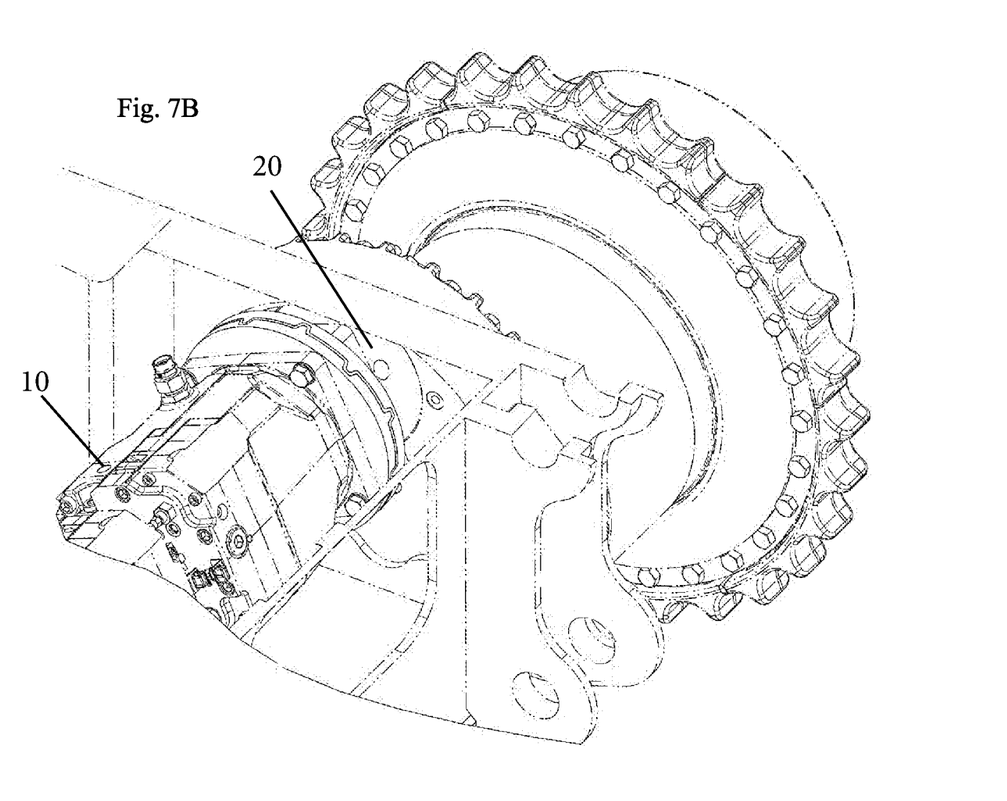
FIG. 7B shows another outer view of the hydraulic motor of FIG. 7A.
Figure 8A:
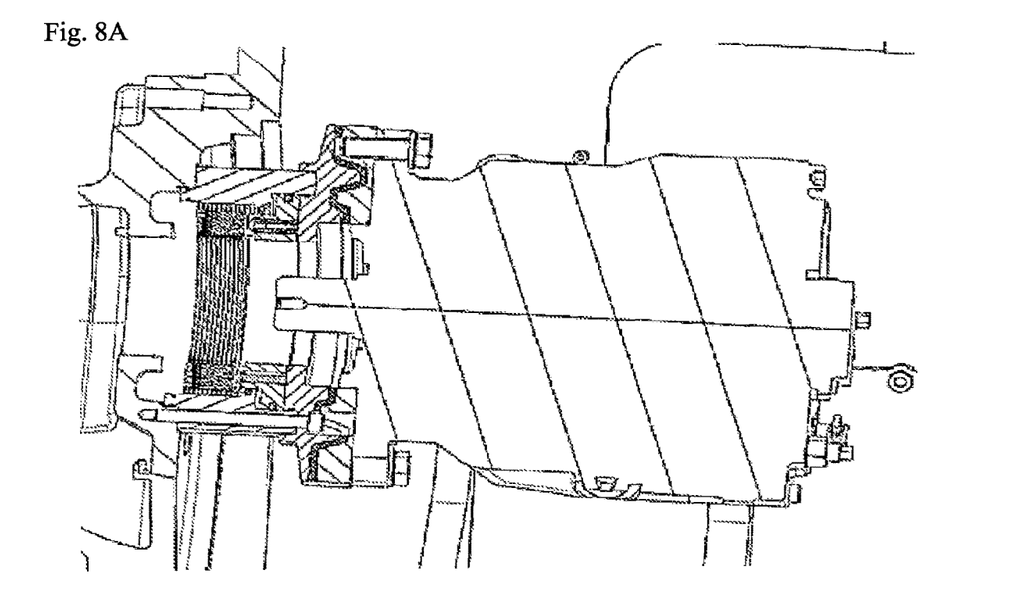
FIG. 8A shows a sectional view of the hydraulic motor coupled to a transmission via an apparatus in accordance with the present disclosure.
Figure 8B:
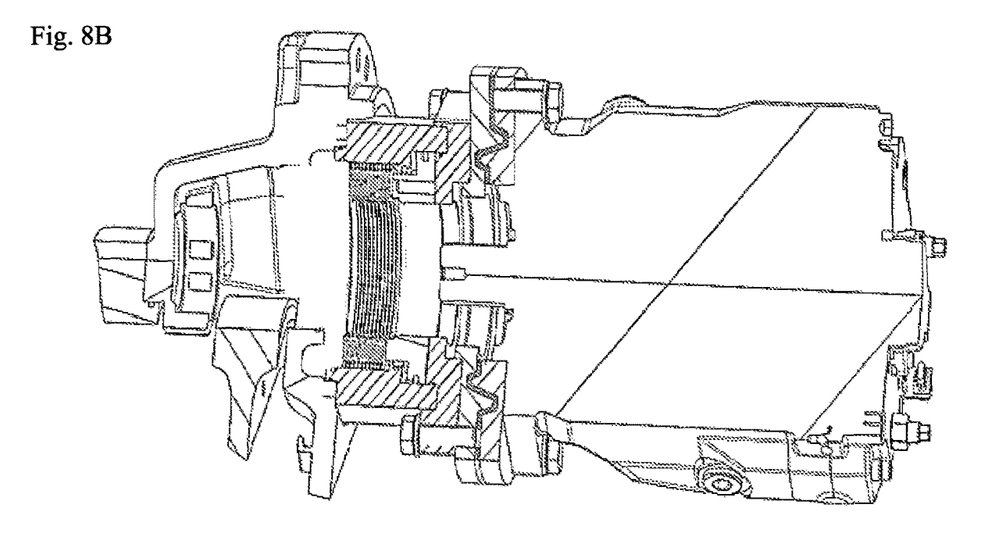
FIG. 8B shows another sectional view of the hydraulic motor of FIG. 8A.
Figure 8C:
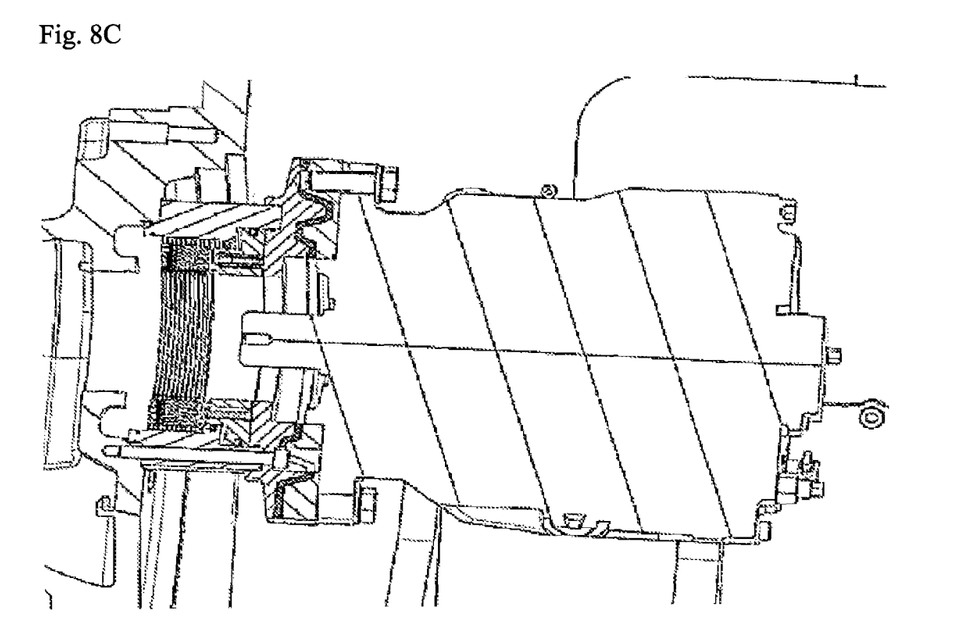
FIG. 8C shows yet another sectional view of the hydraulic motor of FIG. 8A.
Figure 9:
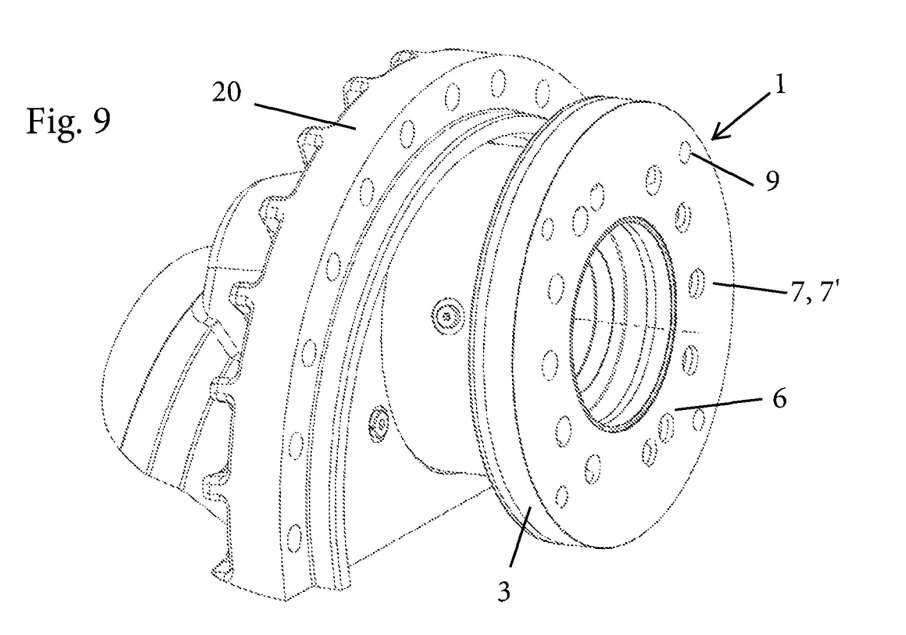
FIG. 9 shows a perspective view of an apparatus in accordance with the present disclosure installed at a transmission.
Figure 10A:
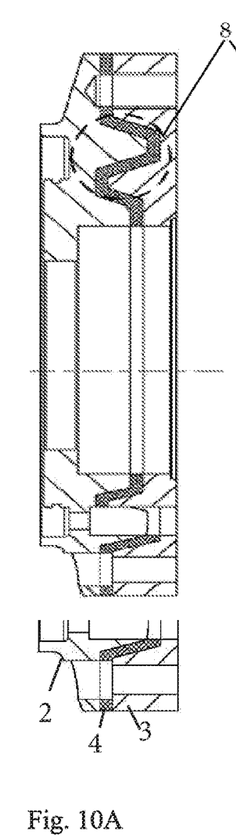
FIG. 10A shows a sectional view of the apparatus in accordance with the present disclosure with a first geometry of the elastomer layer.
Figure 10B:
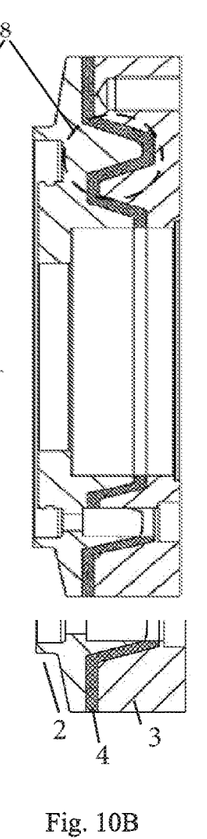
FIG. 10B shows a sectional view of the apparatus in accordance with the present disclosure with a second, different geometry of the elastomer layer.
Figures 10C, 10D:
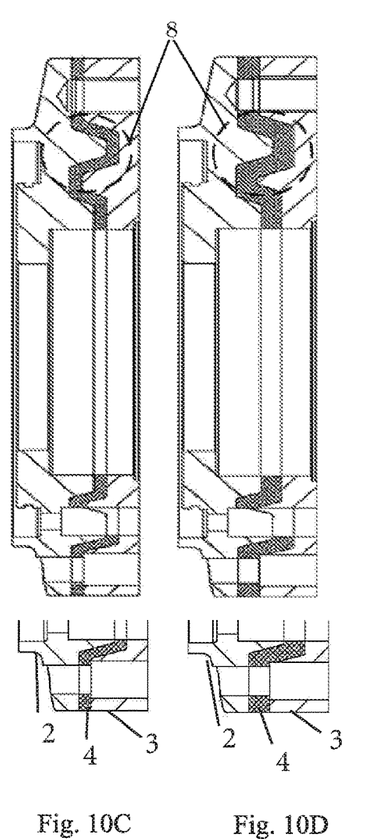
FIG. 10C shows a sectional view of the apparatus in accordance with the present disclosure with a third, different geometry of the elastomer layer
FIG. 10D shows a sectional view of the apparatus in accordance with the present disclosure with a fourth, different geometry of the elastomer layer

FIGS. 7A and 7B show a plan view of a hydraulic motor 10 correspondingly coupled to a transmission 20 while FIGS. 8A to 8C show corresponding sectional views. FIG. 9 shows an apparatus 1 installed at a transmission 20, with further recesses being recognizable beside the passages 25, 35, 45 at the right hand metal disk 3. On the one hand, the apparatus 1 has the already described screw counterbores 6 for cylinder head screws for fastening the apparatus 1 to a flange or to a brake flange, for example. Recesses 7 for securing pins and corresponding securing pins 7' can furthermore be provided at the apparatus 1 and the apparatus 1 can be correspondingly secured by means of them. Furthermore, threaded bores 9 are provided at the right hand metal disk 3 to couple the hydraulic motor 10 to the apparatus 1.

FIGS. 10A-D show cross-sections of the apparatus 1 in accordance with the present disclosure in which the elastomer layer 4 and the metal disks 2, 3 have different mutually facing profiles. In this respect, the axial extent of the elastomer layer 4 that corresponds to the horizontal direction in FIGS. 10A-D can vary between 24 and 32½ mm. The axial extent in this respect depends on the axial extent of the supports 41 to 44. Furthermore, the layer thickness of the elastomer layer can amount to between 6 and 10 mm, which likewise influences the axial extent of the elastomer layer 4. The total axial extent of the apparatus 1 can in particular amount to between 62 and 71 mm.

Figure 11A:
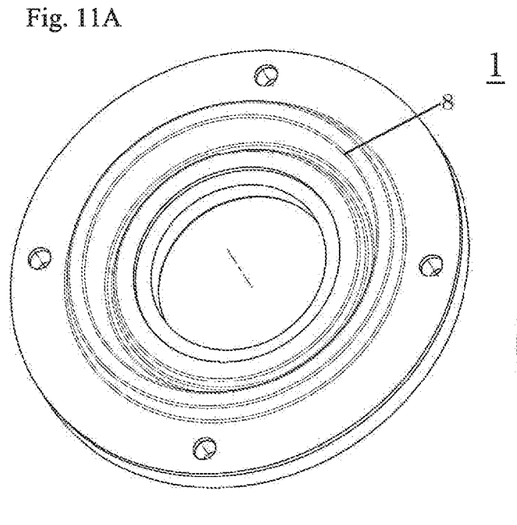
FIG. 11A shows a perspective view of an apparatus in accordance with the present disclosure.
Figure 11B:
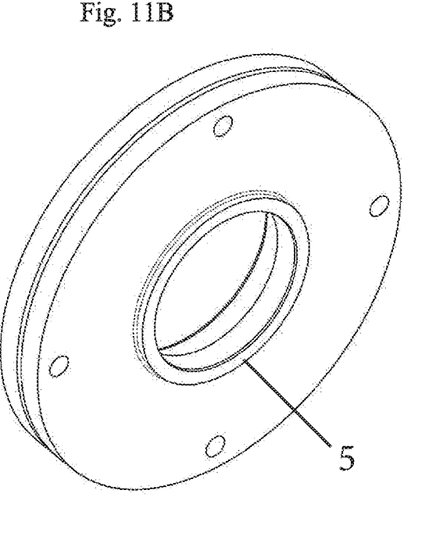
FIG. 11B shows another perspective view of the apparatus of FIG. 11A.

FIGS. 11A and 11B show an apparatus 1 in accordance with the present disclosure in which a ring 8 is provided at its one metal disk 2, 3, 5 that can have an angular cross-sectional surface. The radially inwardly disposed surface of the ring 8 in this respect bounds the inwardly disposed passage 25, 35 of the metal disk 2, 3 associated with it. The ring 8 that can be configured as a steel ring and in one piece with the metal disk 2, 3 associated with it serves the assembly of the decoupling flange 1 or of the apparatus 1 in accordance with the present disclosure to a gearbox, for example, wherein the apparatus 1 can be centered by the ring 8 and can be coupled to the gearbox by means, for example, of cylinder head screws via the corresponding cylinder head screw counterbores. A corresponding ring 8 can also be provided at the respective other metal disk 2, 3 and serves the reception of the hydraulic motor 10 by means of a fastening thread, for example. The hydraulic motor 10 can in this respect also be centered relative to the apparatus 1.

The invention claimed is:

1. An apparatus for connecting a hydraulic motor to a transmission, wherein the apparatus comprises two metal disks and an elastomer layer provided therebetween;
   wherein both metal disks and the elastomer layer each comprise at least one passage; and wherein at least one metal disk and the elastomer layer have an at least partly mutually meshing profile at sides facing one another;

wherein connection of the metal disks takes place exclusively via the elastomer layer; and wherein at least one of the metal disks comprises a ring at a side disposed opposite the other metal disk, with the ring having an angular cross-sectional surface.

2. The apparatus in accordance with claim 1, wherein at least one of the passages has a circular cross-section;

and/or a ratio of metal to elastomer lies between 90/10 and 80/20.

3. The apparatus in accordance with claim 2, wherein the passage of one of the metal disks has a smaller radius than the passage of the other metal disk and/or of the elastomer layer;

and/or the passage of one of the metal disks has a same radius as the passage of the elastomer layer.

4. The apparatus in accordance with claim 1, wherein the passages are arranged coaxially;

and/or the passages are provided disposed radially inwardly at respective parts.

5. The apparatus in accordance with claim 1, wherein a radially inwardly disposed surface of the ring bounds a radially inwardly disposed passage of the corresponding metal disk.

6. The apparatus in accordance with claim 1, wherein at least one of the metal disks and the elastomer layer comprise screw counterbores that extend at least partly also in the respective other metal disk.

7. The apparatus in accordance with claim 1, wherein at least one of the metal disks and/or the elastomer layer has/have a circular outer contour;

and/or the elastomer layer has a Shore A hardness of 50-70; and/or the elastomer layer consists of hydrogenated nitrile butadiene rubber.

8. The apparatus in accordance with claim 7, wherein the elastomer layer has a shore A hardness of 55-65.

9. The apparatus in accordance with claim 1, wherein the elastomer layer is vulcanized to at least one of the metal disks;

and/or the metal disks are composed of steel; and/or the elastomer layer and/or the metal disks comprise/comprises a ring structure that is wavelike.

10. A construction machine having at least one hydraulic motor and at least one transmission, wherein the hydraulic motor and the transmission are connected to one another via the apparatus in accordance with claim 1.

11. The apparatus in accordance with claim 8, wherein the elastomer layer has a shore A hardness of 60.

12. The apparatus in accordance with claim 1, wherein the ring is in one piece with at least one of the metal disks.

13. The apparatus in accordance with claim 1, wherein the elastomer layer comprises a plurality of radially extending supports.

14. The apparatus in accordance with claim 13, wherein the elastomer layer comprises a plurality of peripheral supports.

15. An apparatus for connecting a hydraulic motor to a transmission, wherein the apparatus consists of two metal disks and an elastomer layer provided therebetween;

wherein both metal disks and the elastomer layer each comprise at least one passage; and wherein at least one metal disk and the elastomer layer have an at least partly mutually meshing profile at sides facing one another;

wherein connection of the metal disks takes place exclusively via the elastomer layer; and wherein at least one of the metal disks comprises a ring at a side disposed opposite the other metal disk, with the ring having an angular cross-sectional surface.

* * * * *